(12) United States Patent
Heidtmann et al.

(10) Patent No.: US 10,882,619 B2
(45) Date of Patent: Jan. 5, 2021

(54) SPACE OPTIMIZED CABIN ARRANGEMENT FOR A VEHICLE AS WELL AS A PASSENGER CABIN HAVING A PLURALITY OF SEATS AND SUCH A CABIN ARRANGEMENT

(71) Applicant: AIRBUS OPERATIONS GMBH, Hamburg (DE)

(72) Inventors: Andreas Heidtmann, Hamburg (DE); Tobias Dahms, Hamburg (DE); Roland Lange, Hamburg (DE); Jörg Weifenbach, Hamburg (DE)

(73) Assignee: Airbus Operations GmbH

( * ) Notice: Subject to any disclaimer, the term of this patent is extended or adjusted under 35 U.S.C. 154(b) by 312 days.

(21) Appl. No.: 15/926,678

(22) Filed: Mar. 20, 2018

(65) Prior Publication Data

US 2018/0208317 A1    Jul. 26, 2018

Related U.S. Application Data

(63) Continuation of application No. PCT/EP2016/073389, filed on Sep. 30, 2016.

(30) Foreign Application Priority Data

Oct. 2, 2015   (DE) .................. 10 2015 116 798

(51) Int. Cl.
  *B64D 11/04*   (2006.01)
  *B64D 11/06*   (2006.01)
  *B64D 11/00*   (2006.01)

(52) U.S. Cl.
  CPC .......... *B64D 11/04* (2013.01); *B64D 11/0691* (2014.12); *B64D 2011/0046* (2013.01)

(58) Field of Classification Search
  CPC . B64D 11/04; B64D 11/0007; B64D 11/0691; B64D 2011/0046
  See application file for complete search history.

(56) References Cited

U.S. PATENT DOCUMENTS

2003/0189132 A1\* 10/2003 Brady ...................... B60H 1/00
                                                            244/118.5
2006/0054741 A1   3/2006 Mills et al.
(Continued)

FOREIGN PATENT DOCUMENTS

DE   102010035375 A1   3/2012
DE   102011011704 A1   12/2012
(Continued)

OTHER PUBLICATIONS

European Patent Office, International Search Report for International Application PCT/EP2016/073389, dated Dec. 7, 2016, 3 pages.

*Primary Examiner* — Philip J Bonzell
(74) *Attorney, Agent, or Firm* — Lerner, David, Littenberg, Krumholz & Mentlik, LLP

(57) ABSTRACT

A cabin arrangement for a vehicle includes a first lateral segment module having a first main extension axis, a second lateral segment module having a second main extension axis, and an aisle. The main extension axes run parallel to each other, wherein the first lateral segment module and the second lateral segment module are distanced from each other in a direction perpendicular to the main extension axes and enclose the aisle between each other. The aisle runs parallel to the main extension axes, and the first lateral segment module has a receiving space that receives serving trolleys. The receiving space has an opening that faces into the aisle. The receiving space is designed to receive serving
(Continued)

trolleys arranged transverse to the first main extension axis and staggered parallel to the first main extension axis.

16 Claims, 8 Drawing Sheets

(56) References Cited

U.S. PATENT DOCUMENTS

| | | |
|---|---|---|
| 2009/0261200 A1 | 10/2009 | Saint-James et al. |
| 2010/0181425 A1 | 7/2010 | Guering et al. |
| 2012/0032026 A1* | 2/2012 | Becker .................. B64D 11/02 244/118.5 |
| 2012/0048998 A1 | 3/2012 | Schliwa et al. |
| 2013/0126671 A1 | 5/2013 | Guering |
| 2014/0125092 A1* | 5/2014 | Schreuder ............. B64D 11/00 297/163 |

FOREIGN PATENT DOCUMENTS

| | | |
|---|---|---|
| DE | 102013108121 A1 | 2/2015 |
| EP | 2848532 A1 | 3/2015 |
| WO | 2014125046 A1 | 8/2014 |

* cited by examiner

SPACE OPTIMIZED CABIN ARRANGEMENT FOR A VEHICLE AS WELL AS A PASSENGER CABIN HAVING A PLURALITY OF SEATS AND SUCH A CABIN ARRANGEMENT

CROSS-REFERENCE TO PRIORITY APPLICATIONS

This application is a continuation of international patent application number PCT/EP2016/073389, having an international filing date of Sep. 30, 2016, which claims priority to German patent application number DE 102015116798.0, having a filing date of Oct. 2, 2015. The content of the referenced applications is incorporated by reference herein.

TECHNICAL FIELD

Embodiments of the subject matter described herein relate generally to a cabin arrangement for a vehicle, a passenger cabin having a plurality of seats, one such cabin arrangement, and a vehicle.

BACKGROUND

Vehicles and particularly aircraft that serve the transport of passengers and comprise a cabin with passenger seats arranged therein, often comprise a maximum passenger capacity for achieving economic advantages. Besides the integration of passenger seats, further equipment features are necessary particularly for longer distances covered by the vehicle, in order to ensure the well-being of the passengers. For example, a plurality of toilets and galley arrangements are required, which are usually provided in self-contained cabin monuments.

Increasing a passenger capacity with unchanged dimensions of the vehicle are difficult to accomplish without limiting the comfort of the passengers. Concepts for equipping particularly cabin monuments with a plurality of functions are known, such that an advantage in the use of available installation space is achieved.

German patent publication DE 10 2011 011 704 A1 exemplarily shows a modular cabin segment for a vehicle having segment modules arranged one next to the other, wherein one may exemplarily house a toilet arrangement having at least one lavatory and another one may comprise a galley equipment. At least one of the modules may comprise a vehicle attendant seat, which at one side is swivably mounted around an axis on the respective module.

German patent publication DE 10 2010 035 375 A1 illustrates an arrangement for receiving passengers in a transportation means, which arrangement comprises a first placement space, a second placement space and a third placement space, which are arranged on a common placement surface one next to the other, wherein two of the placement spaces are equipped with a receiving unit for receiving a passenger, while one of the placement spaces receives a stowage cabinet.

BRIEF SUMMARY

Consequently, it is an object of the disclosure to design a cabin for a vehicle in a way that a most efficient use of the available installation space is ensured. Particularly, it is an object of the disclosure to propose a cabin arrangement for a vehicle, which allows a most compact integration of a galley and other installations under maximizing the passenger seats present.

The object is met by a cabin arrangement for a vehicle having the features of independent claim 1. Advantageous embodiments and further improvements can be gathered from the sub-claims and the following description.

A cabin arrangement for a vehicle is proposed, comprising a first lateral segment module having a first main extension axis, a second lateral segment module having a second main extension axis and an aisle. The first main extension axis and the second main extension axis run parallel to each other. The first lateral segment module and the second lateral segment module are distanced from each other in a direction perpendicular to the main extension axis and enclose the aisle between each other, which aisle runs parallel to the main extension axis. The first lateral segment module comprises at least one receiving space for receiving serving trolleys, wherein the at least one receiving space comprises a receiving opening, which faces into the aisle. The at least one receiving space is designed for receiving serving trolleys, which are arranged transverse to the first main extension axis and staggered parallel to the first main extension axis.

Resultantly, the cabin arrangement according to the disclosure is spatially defined through two lateral segment modules, which each comprises a main extension axis, such that substantially three elements parallel to each other, i.e. first lateral segment module, aisle and second lateral segment module, are provided. The cabin arrangement may particularly extend over a whole available area of the cross-section of a passenger cabin in a lateral direction. The main extension axes define main extension directions, wherein "main" may be understood as referring to the dimension which is determining for the respective segment module.

The term "lateral segment module" is to be considered as a part of the cabin arrangement, which is present in a lateral, i.e. sideways region and preferably extends along a lateral region of the respective cabin. In case of a passenger cabin being elongated and particularly designed with a tube shape, a main extension axis of a lateral segment module is thus parallel to a longitudinal or center axis of the respective cabin.

The staggered arrangement of serving trolleys in a longitudinal direction, wherein the serving trolleys themselves are oriented transverse to the first main extension axis, allows a very compact integration into a receiving volume for receiving of serving trolleys in a vehicle cabin.

The aisle is a surface region created on the floor between sides of the lateral segment modules facing to each other and allows a user to step between the lateral segment modules, in order to use the different functions offered by the cabin arrangement. The aisle in the cabin arrangement may allow passing through a cabin segment, which is created by the first and the second lateral segment module. Thus, the cabin arrangement may be placed in a forward region of an aircraft cabin, through which flight crew members may enter or exit a cockpit. Since this space is usually not entered by passengers during a normal operation of the vehicle, also an asymmetrically designed arrangement may be realized, which may combine as many functions as possible in a space as compact as possible.

The cabin arrangement thus may constitute a particular space-saving, compact combination from a galley having at least a basic configuration as well as a passage to a cockpit, in that placement spaces for serving trolleys are positionable in a lateral, longitudinal arrangement. The cabin arrangement is capable to be integrated into a cabin of a vehicle as a closed arrangement, which extends over the whole cross-section of the cabin.

In an advantageous embodiment, the cabin arrangement further comprises a first vehicle attendant seat arranged between the main extension axis of the lateral segment modules and at a distance to the lateral segment modules along the main extension axis. The vehicle attendant seat thus does not stand in an intermediate space between the lateral segment modules, but is slightly shifted away therefrom, such that particularly in case of very narrowly designed aisles, a sufficiently broad passage opening from a lateral region into the aisle is made possible. A user thus walks between the vehicle attendant seat and the respective segment module in the aisle between the segment modules. Especially in case of positioning the arrangement in a forward region of the passenger cabin, the vehicle attendant seat allows an optimum view into the passenger cabin, particularly when the seat direction is facing away from the lateral segment modules.

In a particularly advantageous embodiment, the first vehicle attendant seat is arranged on an independent pedestal. In this context, the term "independent" is to be understood as a pedestal, which is independent from other installations and cabin monuments, which pedestal is freely positioned within the cabin and does not depend on other installations for realizing the holding function for the vehicle attendant seat. Of course, this does not relate to mounting the pedestal to a structural component of the vehicle, exemplarily through seat rails, which are arranged in the floor of the cabin.

In an alternative embodiment the cabin arrangement comprises a first vehicle attendant seat, which is arranged on one of the lateral segment modules or a component in-between on a surface, which is orientable transverse to the respective main extension axis. This surface may be a delimiting surface of a segment module, which is faced to the passenger seats. Alternatively, the surface may also belong to a component arranged between the segment modules, such as a cockpit door or an adjacent walling. The cockpit door may extend transverse to the main extension axes in a closed state, such that in this state a use of the first vehicle attendant seat is possible. The door may be designed for a flush integration of the first vehicle attendant seat. As an alternative, the door may be designed for a mounted-on arrangement of the vehicle attendant seat. The first vehicle attendant seat may also only partially reach into the door.

In an advantageous embodiment the first vehicle attendant seat may be laterally movable, i.e. displaceable; and arrestable in at least two laterally distanced positions. Thus, a particularly advantageous use position for the first vehicle attendant seat may be reached, while in a stowage position the first vehicle attendant seat is moved in a way such that it does not block activities at the cabin arrangement or block the passage.

The cabin arrangement may further comprise a second vehicle attendant seat, which is arranged at a first back wall positioned at an end of one of the first lateral segment module and the second lateral segment module facing away from the first vehicle attendant seat. This leads to a kind of tandem arrangement of two vehicle attendant seats, wherein depending on the intended width of the first or the second lateral segment module, a slight lateral displacement between the two vehicle attendant seats is present.

The second vehicle attendant seat is particularly arranged at the first lateral segment module. The position of the second vehicle attendant seat is preferably adjacent to the receiving space, wherein it should be ensured, that by placing the second vehicle attendant seat, the access on the receiving space is not impaired. Preferably, this may be accomplished through a staggering in longitudinal direction, i.e. along the main extension axis of the first lateral segment module, or through integration of a swivably supported holder for the second vehicle attendant seat.

The first and the second vehicle attendant seat preferably create a tandem arrangement, through which both vehicle attendant seats are arranged one behind the other in a limited distance. Depending on the available installation space in the cabin, both vehicle attendant seats are offset to each other. In case the first vehicle attendant seat is placed centrally within the cabin in order to provide an overlapping seat region with the passengers, who are sitting at a central aisle, the second vehicle attendant seat may, particularly in case of the use of the passage to a cockpit, be laterally offset from this passage.

In a particularly advantageous embodiment, the second vehicle attendant seat is arranged between the receiving space and a sidewall arranged opposite to the sidewall, to which sidewall the aisle connects. The vehicle attendant seat is thus arranged in the first lateral segment module and may, particularly in combination with a partition curtain, provide a comfortable resting space within the first lateral segment module.

Particularly preferred the first back wall spans up plane, which extends perpendicular to the first main extension axis or the second main extension axis. The second vehicle attendant seat is thus straightly oriented into the cabin.

At least one of the lateral segment modules may comprise at least one first compartment having an access opening extending perpendicular to the main extension axis. This first compartment is consequently directly accessible from the aisle between the lateral segment modules in direct viewing direction perpendicular to the main extension axis. Depending on the available surface area, a matrix of such first compartments may be provided, which serve different purposes. It is particularly preferred to place the compartment in the first lateral segment module above the receiving space for receiving of serving trolleys and to additionally provide a working surface on the receiving space with a sufficient free volume between the working surface and the at least one first compartment. The working surface and the working area connecting above allows to place items, prepare meals and the such. The at least one first compartment may be open, having flaps, and for receiving of standard units, which may retain different items for use in a vehicle galley.

Additionally, at least one of the lateral segment modules may comprise a second compartment, which is closed on a side facing the aisle and which comprises an access opening, which is open in a direction parallel to the respective main extension axis or the aisle, respectively. The compartment may thus comprise a stowage space or an integration tray for a certain piece of equipment, which runs parallel to the main extension axis and which is activatable, handleable or operatable from this direction. Through the arrangement of the first compartment transverse to the orientation of a serving trolley in the receiving space, a particularly compact design may be accomplished, since a side of the first compartment facing the aisle may be flush with a plane, which is constituted by the receiving opening in the receiving space, such that the required installation depth transverse to the main extension axis of the respective segment module is as small as possible.

If desired, at least a first or a second compartment may be designed for receiving at least one electrical appliance. Besides the supply with a suitable voltage for a suitable appliance, additionally an air suction opening and exemplarily a water supply may be present. It may be feasible to provide a device for preparing drinks, e.g. a coffeemaker or similar, in such a first compartment.

In an advantageous embodiment, the cabin arrangement comprises a closable passage opening at a first end, which e.g. selectively blocks or releases the axis to a cockpit in an aircraft. Additionally, it is conceivable to arrange a flap at a walling adjacent to a lavatory, which flap closes a second end of the cabin arrangement and which allows a user coming from a first end of the cabin arrangement to enter the lavatory without impairments. At the same time, it is prevented to let passengers enter the cockpit through the aisle.

The lateral segment modules may each comprise a front, which directly connects to a door region of the vehicle. The cabin segment may resultantly be installed directly up to the door region, which additionally leads to a particularly efficient use of the available installation space. Particularly for passengers facing to the front, whose passenger seats are shifted up to the door region, a screen may be arranged on the front. This is particularly possible, in case none of the fronts is used for receiving a vehicle attendant seat, when the vehicle attendant seat or seats are integrated into the cabin arrangement as explained above. The passengers that protrude into the door region are provided with a particularly large leg room, in case the passenger cabin does not need to be closed off through a partition wall in this region.

At least one lateral segment module may comprise a holding device exterior to the aisle and exterior to the receiving space for temporarily holding a serving trolley. Due to the compact design of the cabin arrangement and the aisle, which is particularly narrow in some embodiments, it is required to store at least one serving trolley exterior to the aisle between or at the lateral segment modules for loading, emptying for rearranging of serving trolleys, which requires a temporary holding the respective serving trolley particularly in case of the use in an aircraft. Besides foldably supported holding frames or similar form-fit elements, a holding belt is provided in a particularly simple variant, which holding belt may be placed around a serving trolley and be arrested.

At least one of the first lateral segment module and the second lateral segment module may comprise a lavatory, which is accessible through a lavatory opening facing into the aisle. Due to the particularly good use of the provided installation space in the cabin arrangement it is possible to integrate additional passenger seats in the cabin, which relatively closely reach to the first and/or second lateral segment module. Consequently, an access opening to a lavatory, which is arranged in one of the lateral segment modules, does not lead to disturbing of passengers sitting near the respective segment module.

Embodiments of the invention further relate to a passenger cabin, comprising a plurality of seats and at least one cabin arrangement as described above.

Furthermore, embodiments of the invention relate to a vehicle, comprising a passenger cabin having a plurality of seats and at least one such cabin arrangement. Particularly preferred the vehicle is an aircraft and the cabin arrangement is placed at a forward end of the passenger cabin.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present disclosure result from the following description of the exemplary embodiments illustrated in the figures. In this respect, all described and/or graphically illustrated characteristics also form the object of the disclosure individually and in arbitrary combination regardless of their composition in the individual claims or their references to other claims. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
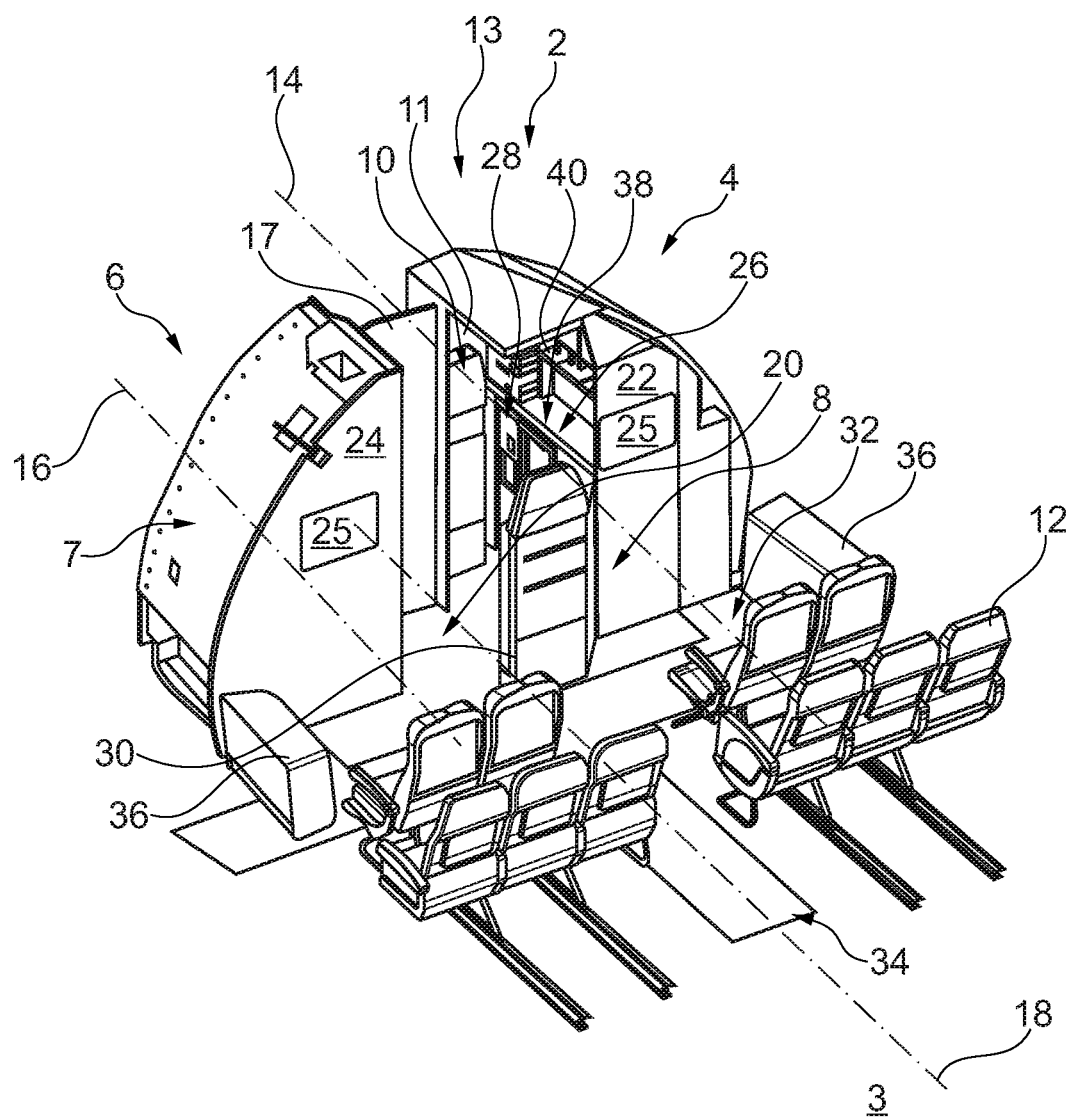
FIGS. 1 to 11b show a cabin arrangement in two- and three-dimensional illustrations.

FIG. 1 shows a cabin arrangement 2 in a cabin 3 of an aircraft, having a first lateral segment module 4, a second lateral segment module 6, a first vehicle attendant seat 8, a second vehicle attendant seat 10 and a plurality of passenger seats 12. Exemplarily, the cabin arrangement 2 is arranged in a forward region of a passenger cabin 3 and in particular of an aircraft cabin, in which a cockpit is placed, which is not illustrated herein.

The first lateral segment module 4 comprises a main extension axis 14, the second lateral segment module 6 a second main extension axis 16. These substantially run parallel to each other and particularly parallel to a longitudinal axis of the cabin, in which the cabin arrangement 2 is placed. Both segment modules 4 and 6 and particularly the second lateral segment module 6 may accommodate a lavatory 7, which is particularly preferred accessible from an aisle 20 between the segment modules 4 and 6 or, as an alternative, from a front 22 or 24, respectively, which face the cabin seats 12, or a corner between these two sides, e.g. the corner 25 of the second lateral segment module 6 reaching into the cabin 3.

A specific feature of the cabin arrangement 2 lies in the integration of a receiving space 26 for receiving of serving trolleys 28 in the first lateral segment module 4, wherein the serving trolleys are arranged perpendicular to the first extension axis 14 and are staggered along, e.g. parallel to, the first extension axis 14. Consequently, the receiving space 26 is designed in a lateral-longitudinal manner and may achieve a particularly efficient use of the provided installation space. Depending on the depth of the received serving trolleys 28, sufficient space is present from front 23 to an end 13 of the cabin arrangement facing away from the passenger seats 12, for integrating the second vehicle attendant seat 10 in the first lateral segment module 4 laterally offset to the receiving space 26 or to integrate it following the receiving space 26 at a first back wall 11, which spans up a plane, that preferably runs perpendicular to the first main extension axis 14.

A further specific feature of the cabin arrangement 2 is the first vehicle attendant seat 8, which is independently arranged on a pedestal 30 or another suitable device, which vehicle attendant seat is present in a door region 32, to which also the passenger seats 12 extend and which are not separated therefrom through a partition wall. Through providing a distance between the first vehicle attendant seat 8 and the fronts 22 and 24 of the segment modules along the longitudinal axis 18 and a respective offset to the passenger seats 12 it may on the one hand be provided a sufficiently wide passage from outside into the cabin arrangement 2 and on the other hand the first vehicle attendant seat 8 exclusively extends along a central aisle 34 into the passenger cabin, on which no passenger seats 12 are present, but only adjacent thereto. Consequently, if a vehicle attendant sits on the first vehicle attendant seat and views into the central aisle 34, the seat regions or the regions occupied by the legs of the vehicle attendant and the passengers sitting on adjacent passenger seats 12 overlap in a longitudinal direction, which neither impairs the comfort of the passenger nor of the vehicle attendant. Also, the first vehicle attendant seat is only seldom occupied, such that this overlapping only seldom occurs.

This allows to place the most forward passenger seats 12 far to the door region 32 or to provide an additional passenger seat row in the first place, since for the positionability of the passenger seats 12 exclusively the distance to the fronts 22 or 24, respectively, is to be considered. All minimum distances of the vehicle attendant seat 8 to passengers as well as from the passenger seats to other installations may be met, if it reaches into the central aisle 34 or is aligned thereto.

Through the arrangement of the vehicle attendant seats 8 and 10 as shown, a placement of vehicle attendant seats at the fronts 22 and 24 is not required. Consequently, these may receive screens 25 or the such, which serve a personal comfort of passengers on the passenger seats 12 facing the fronts 22 and 24. Due to the distance of the passenger seats 12 to the fronts 22 and 24 determined by the door region 32, a considerable leg room may be accomplished, which may furthermore be used as a small conference compartment by means of an optional swiveling seat at the respective front 22 or 24, respectively (not shown) which conference compartment may be separated through a curtain.

In FIG. 1, the door region is indicated through slide compartments 36, in which the emergency slides for the aircraft are contained. The region therebetween, which extends along the cabin arrangement 2, is to be considered as door region 32. Due to the slide compartments 36 reaching into the door region 32, this region facing the fronts 22 and 24 is mainly suitable for integration of four passenger seats 12, which are relatively far inboard.

As visible in FIG. 1, a working surface 38 is arranged on the receiving space 26, above which first compartment 40 may extend, in which exemplarily so-called "standard units" are placeable. Between a lateral, inner delimitation 39 (see particularly FIG. 5) of the first working surface 38 and an inner sidewall 42 of the first segment module 4, the second vehicle attendant seat 10 is placed, which comprises the same seating direction as the first vehicle attendant seat 8. Through use of the receiving space 26 for receiving of serving trolleys 28, a sufficient distance between the two vehicle attendant seats 8 and 10 may be ensured.

At the end 13 of one of the first lateral segment module 4 and the second lateral segment module 6 facing away from the first vehicle attendant seat 8, a closable passage door 17 may be provided between the segment modules 4 and 6, which exemplarily allows a passage to a cockpit or the such.

Figure 2:
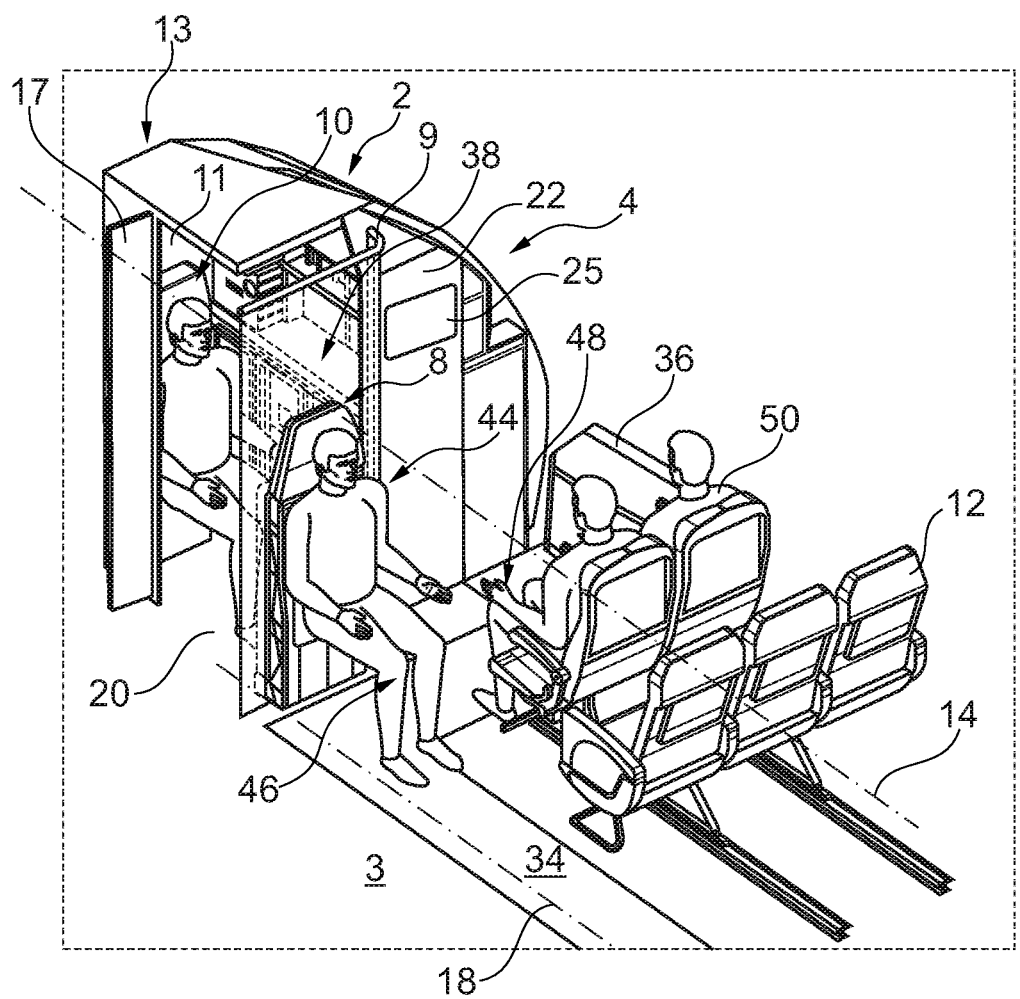

FIG. 2 shows a half of the cabin arrangement 2. Here, a vehicle attendant 44 is shown, who sits on the first vehicle attendant seat 8. The knees 46 of the vehicle attendant 44 overlap with knees 48 of a passenger 50 along the longitudinal axis 18, which passenger sits on a passenger seat facing the front 22 of the first segment module 4. Consequently, the seat regions of the vehicle attendant 44 and the passenger 50 overlap in longitudinal direction. As, however, is visible, the individual comfort of the passenger 50 is not impaired at all.

For providing a temporary rest compartment, which substantially includes the whole intermediate space between the lateral segment modules 4 and 6, a separation curtain 9 may be closed behind the first vehicle attendant seat 8, wherein the separation curtain 9 may extend between the fronts 22 and 24.

Figure 3:
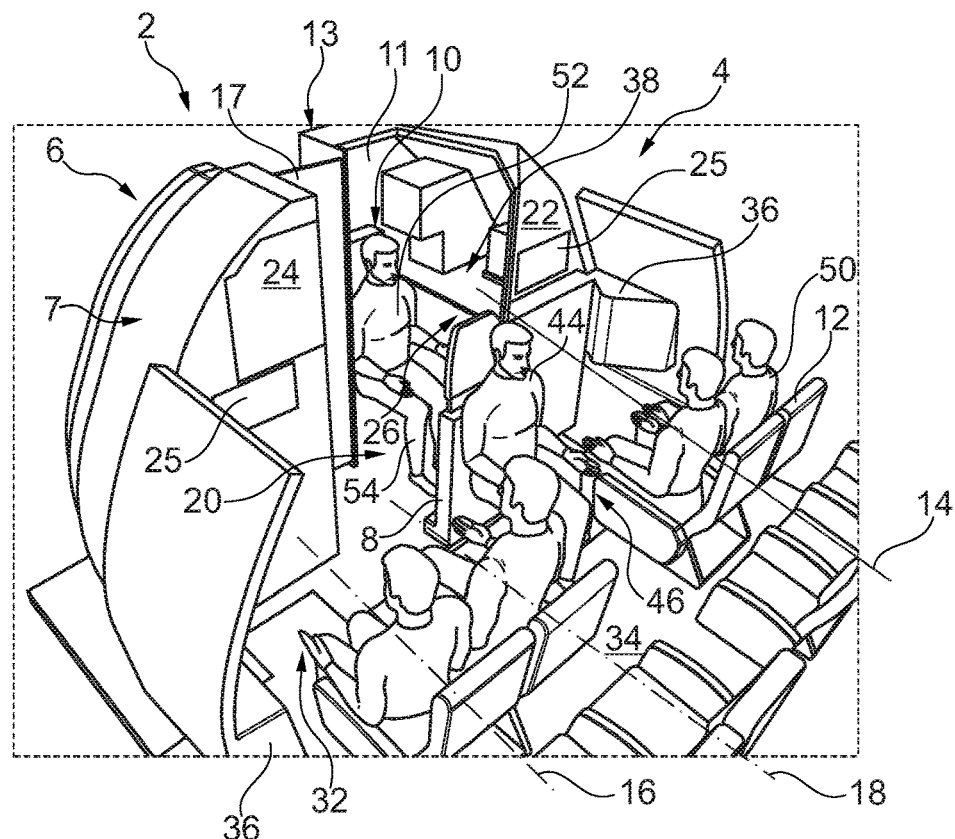

Likewise, FIG. 3 shows a further flight attendant 52 on the second vehicle attendant seat 10, which flight attendant 52 comprises a sufficient space between knees 54 and the back side of the first vehicle attendant seat 8. Additionally, the position of the flight attendant 44 in relation to further passengers 50 sitting adjacent to the flight attendant 44 at a right-hand side. The directly adjacent passenger 50 also comprises an overlapping seat region to the flight attendant 44.

Figure 4:
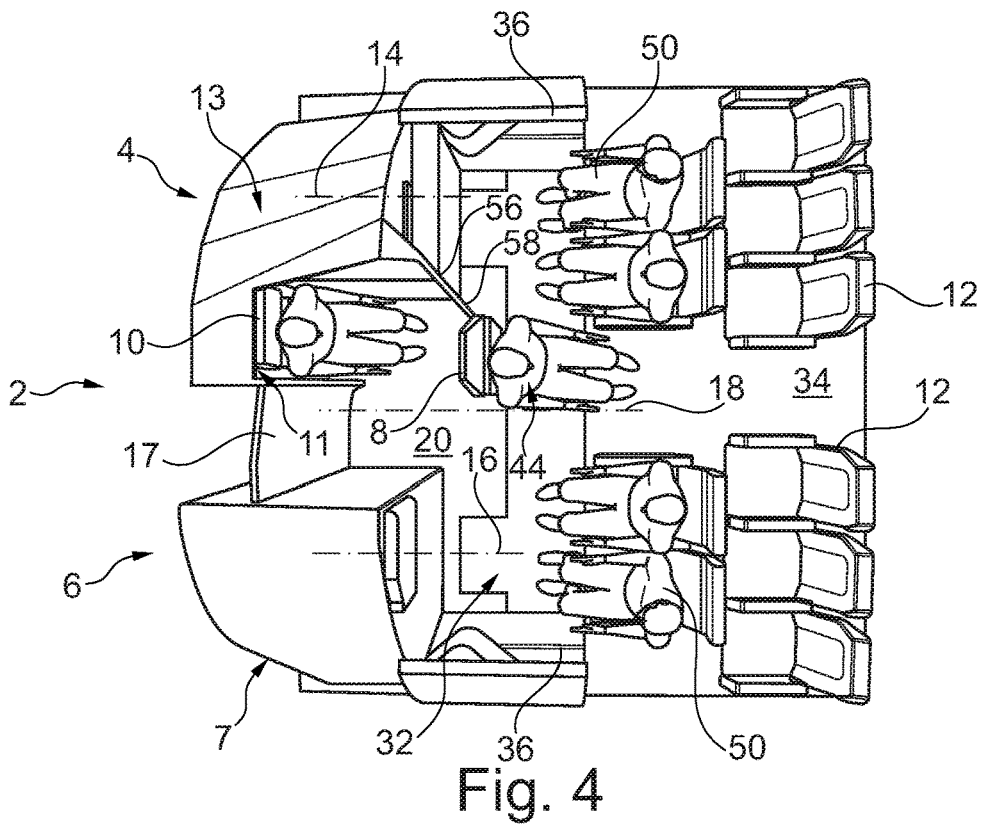

This illustration is further improved in FIG. 4 in form of a top view. Here it is further visible that between the first vehicle attendant seat 8 and an edge 56 of the front 22 facing inwardly, a beveled intermediate wall 58 is present, which prevents passing an intermediate space between the first vehicle attendant seat 8 and the first lateral segment module 4.

Figure 5:
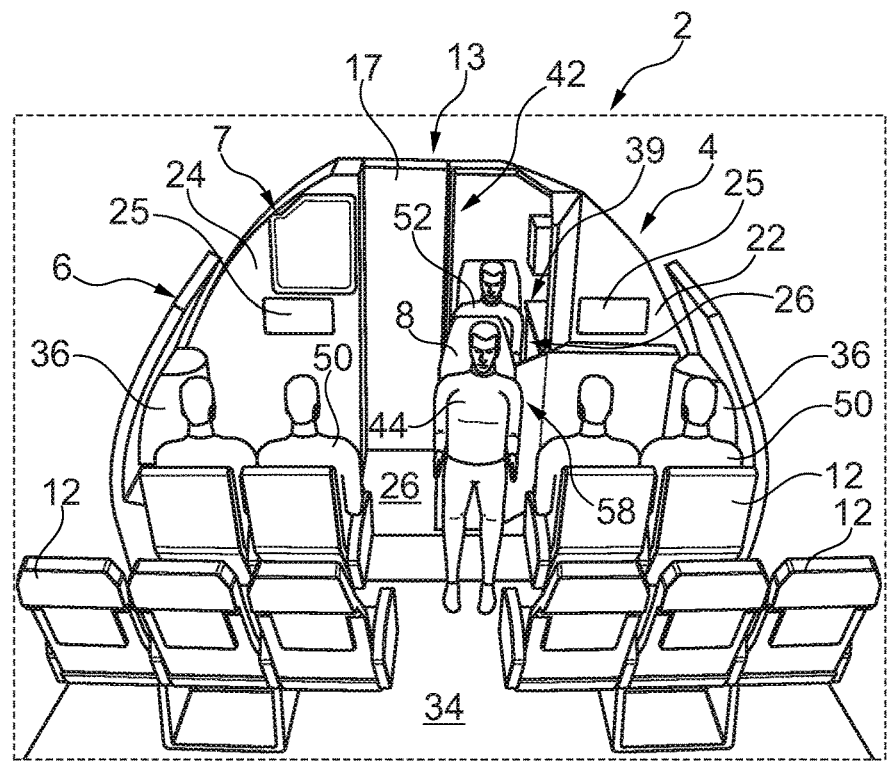

FIG. 5 shows a front view on the back end of the cabin arrangement 2 having four passengers 50 on passenger seats 12 facing to the fronts 22 and 24 as well as to vehicle attendant seats 44 and 52 on both vehicle attendant seats 8 and 10.

Figure 6:
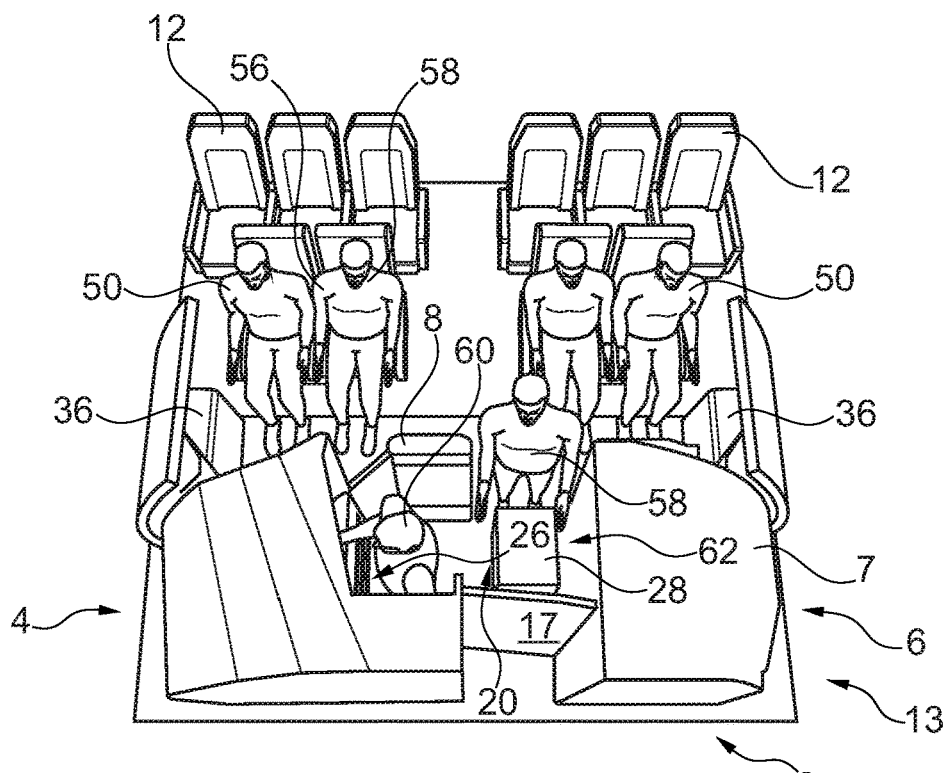

FIG. 6 shows two crew members 58 and 60, which conduct different tasks in the cabin arrangement 2. While one crew member 60 stands at the working surface 38, the other crew member moves a serving trolley 28 having a half construction depth. The space between the first vehicle attendant seat 8 and a sidewall 62 inwardly directed of the second lateral segment module 6 are sufficient that the crew member 58 may sufficiently move.

Figure 7:
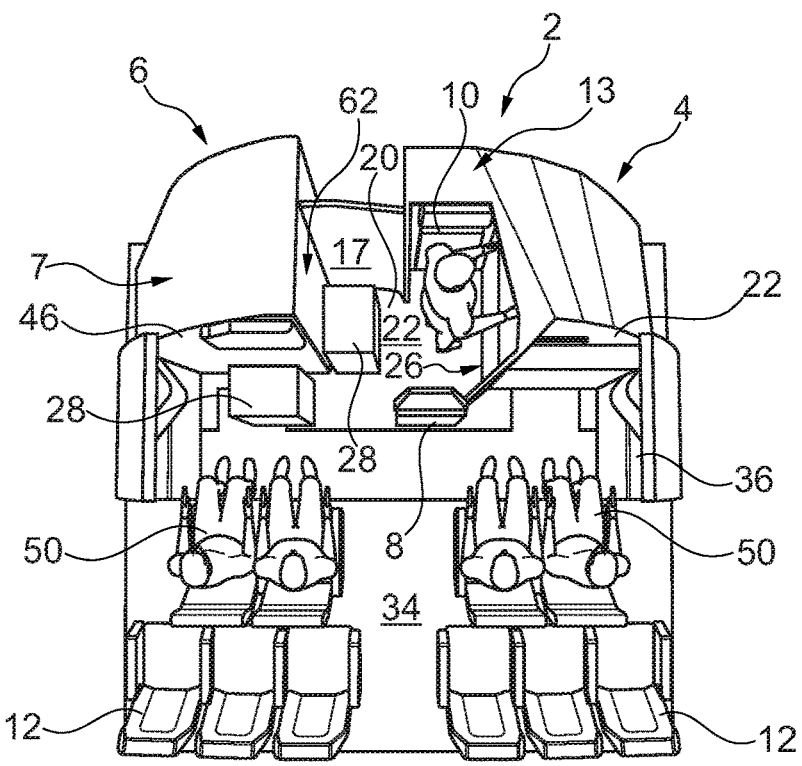
Figure 8:
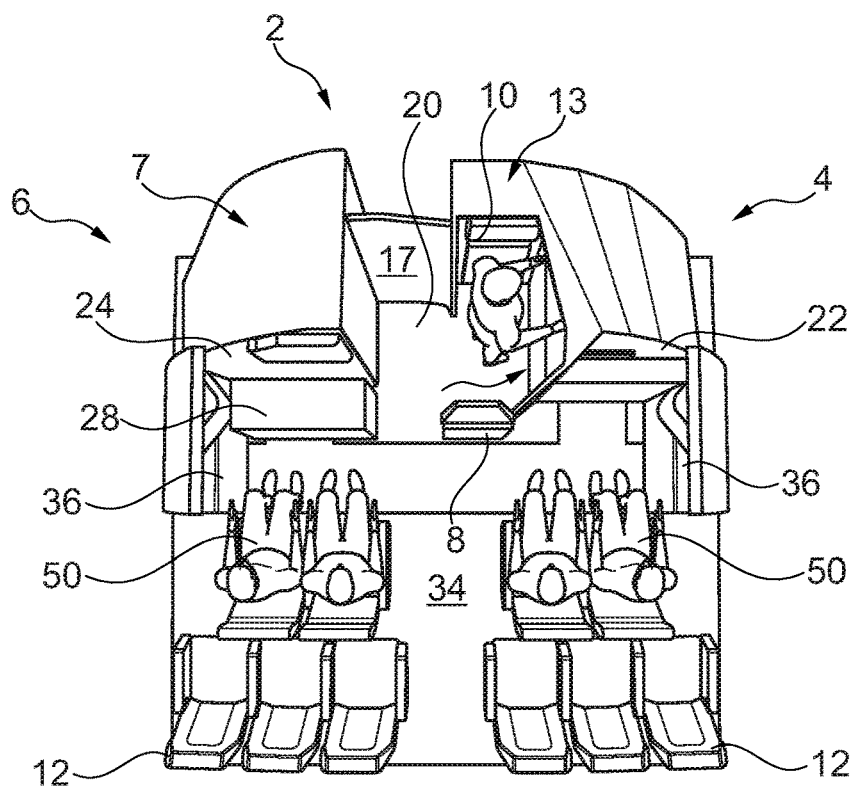

Additionally, as shown in FIGS. 7 and 8, the space in front of front 24 may be sufficient for parking a serving trolley 28 having a half or full construction depth, respectively, as well as at the sidewall 62 of the second lateral segment module 6 facing inwardly. It is conceivable and sensible to attach holding devices at this place, which may temporarily hold the serving trolley 28 in this orientation.

Figure 9A:
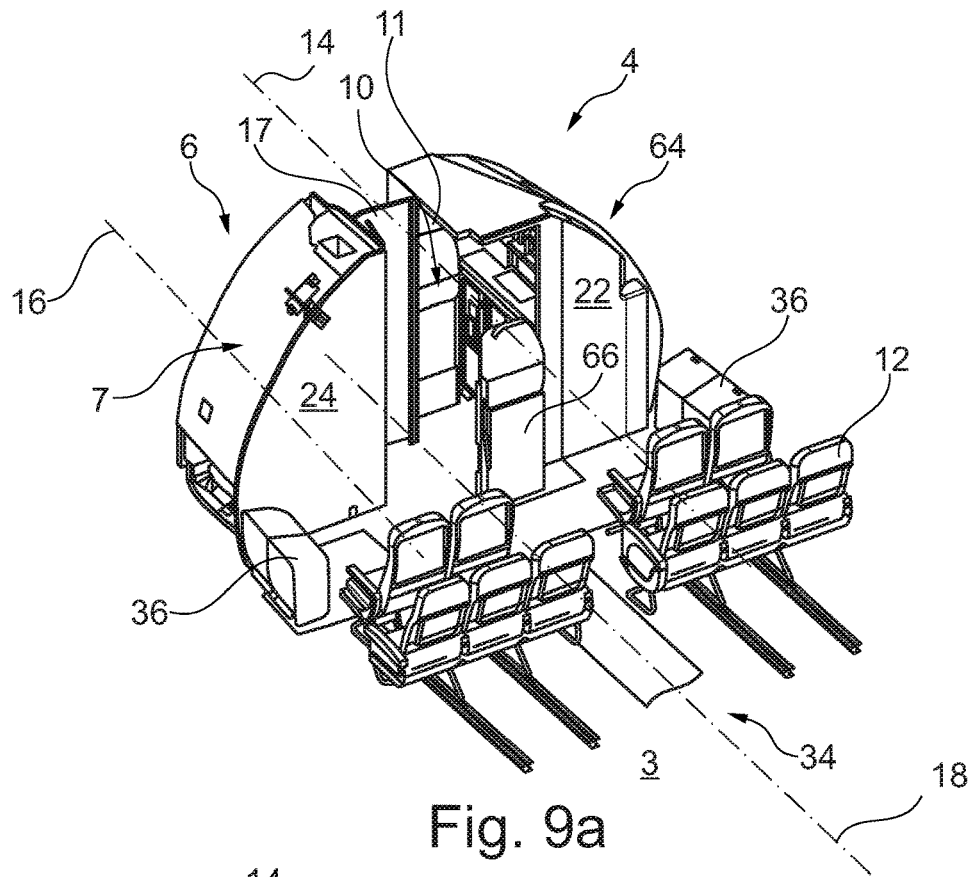
Figure 9B:
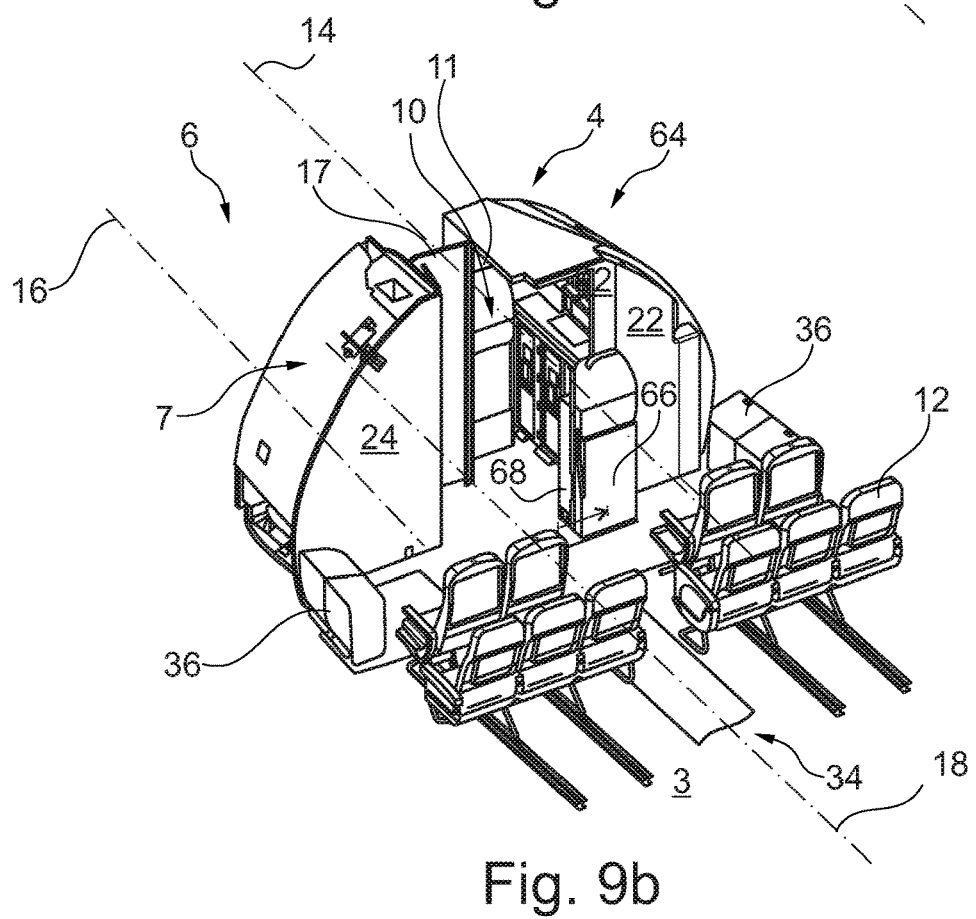

In FIGS. 9a and 9b a cabin arrangement 64 is shown, which is substantially similar to the cabin arrangement 2. However, a difference lies in the use of a first vehicle attendant seat 66, which differs from the first vehicle attendant seat 8 in that it is movably, i.e. displaceably, supported.

In FIG. 9a a first position is shown, which is assumed during traveling of the aircraft on the runway, during start or landing (Taxi, Take-Off, Landing: "TTL position"). This may be centered laterally, i.e. in a direction transverse to the longitudinal axis of the cabin. This allows a particularly good view to the center aisle 34 for the cabin attendant.

FIG. 9b shows the first vehicle attendant seat 66 in a second position, in which the first vehicle attendant seat is partially laterally moved in front of the front 22. Hence, the free available space for the crew of the aircraft to conduct different activities, i.e. preparing meals and drinks, filling and emptying trolleys, etc. is clearly increased.

The first vehicle attendant seat 66 may be arranged at a fixedly installed stand 68, which allows displacement of the first vehicle attendant seat. As an alternative, a displaceable pedestal or a displaceable construction on a fixedly installed pedestal for receiving a first vehicle attendant seat is conceivable.

Figure 10A:
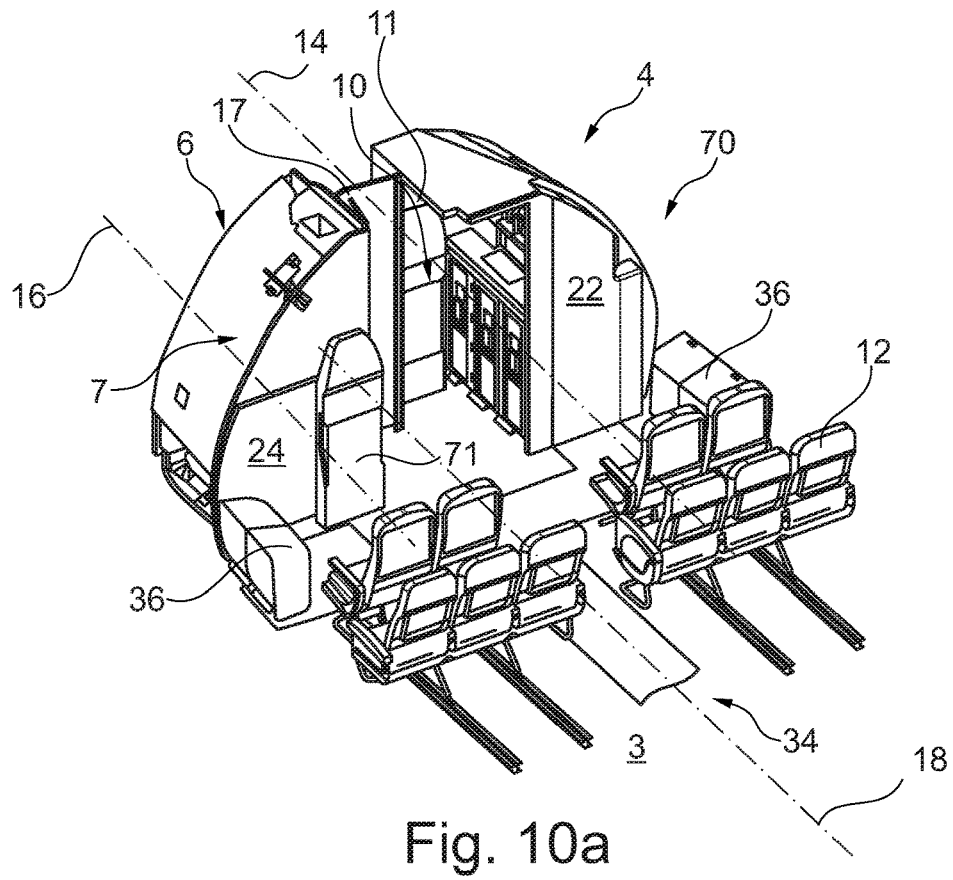
Figure 10B:
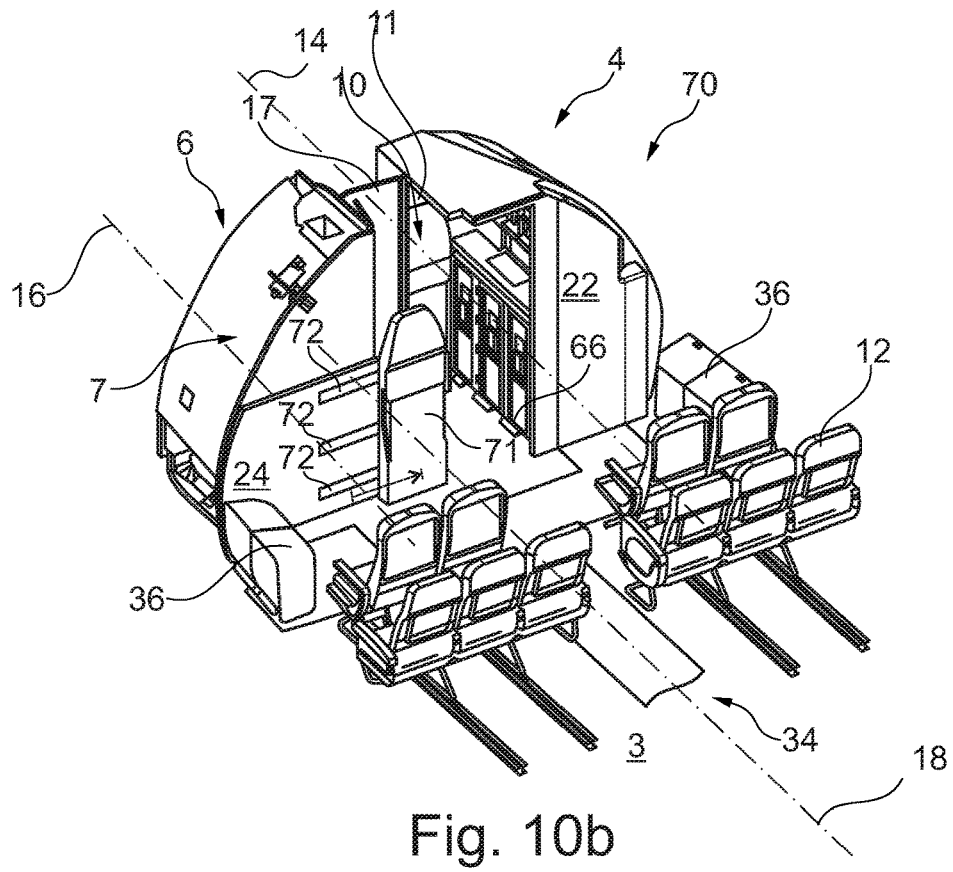

In FIGS. 10a and 10b a further modification in form of a cabin arrangement 70 is shown, in which a first vehicle attendant seat 71 is movably, i.e. displaceably, supported on the second front 24. While a first position in FIG. 10b is shown as TTL position, in FIG. 10a a second position for all other flight phases is shown. For moving the first vehicle attendant seat 71 a number of parallel arranged rails 72 are attached to the front 24 in a horizontal manner. The first vehicle attendant seat 71 is particularly placed in the position shown in FIG. 10a in cruise mode, i.e. during normal flight. The seat is moved to a position, which increases the available space for using the galley as well as to improve to access to the lavatory. In this position, the first vehicle attendant seat 71 may only seldom be used in crew rest phases.

The first vehicle attendant seats 66 and 71 may be arrested in both positions shown, in order to prevent a self-acting motion.

Figure 11A:
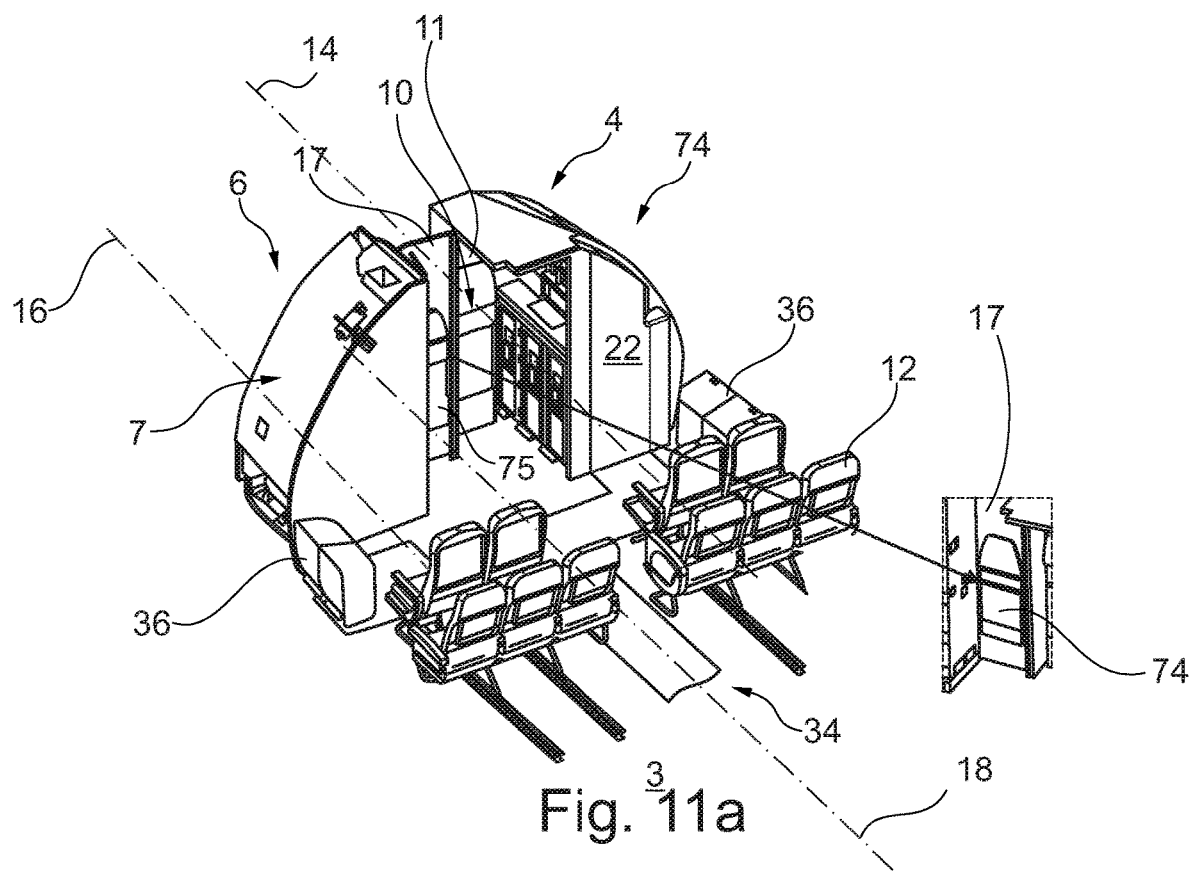
Figure 11B:
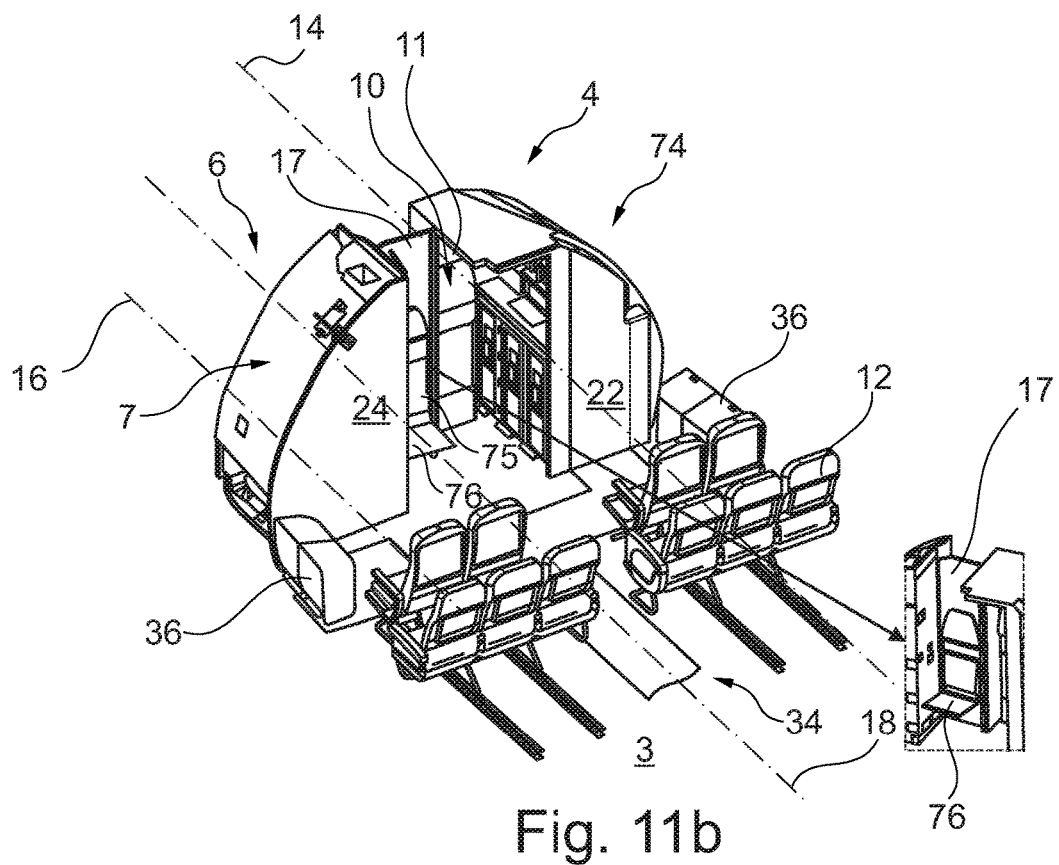

Finally, FIGS. 11a and 11b show a first vehicle attendant seat 74, which is arranged at the cockpit door 17 and comprises a foldable design. In FIG. 11a the first vehicle attendant seat 74 is shown in a resting or neutral position, while in FIG. 11b the first vehicle attendant seat 74 is shown in the TTL position. Here, a seating surface 76 is swiveled from a vertical position (see FIG. 11a) into a horizontal position, in order to be used.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A cabin arrangement for a vehicle, the cabin arrangement comprising:

a first lateral segment module having a first main extension axis;

a second lateral segment module having a second main extension axis;

an aisle;

a first vehicle attendant seat arranged between the main extension axes of the lateral segment modules and at a distance to the lateral segment modules along the main extension axes; and a second vehicle attendant seat arranged at a first back wall positioned at an end of one of the first lateral segment module and the second lateral segment module facing away from the first vehicle attendant seat;

wherein the first main extension axis and the second main extension axis run parallel to each other;

wherein the first lateral segment module and the second lateral segment module are distanced from each other in a direction perpendicular to the main extension axes and enclose the aisle between each other, wherein the aisle runs parallel to the main extension axes;

wherein the first lateral segment module comprises at least one receiving space to receive serving trolleys, wherein the at least one receiving space comprises a receiving opening, which faces into the aisle; and wherein the at least one receiving space is configured to receive serving trolleys, which are arranged transverse to the first main extension axis and staggered parallel to the first main extension axis.

2. The cabin arrangement according to claim 1, further comprising a first vehicle attendant seat arranged on one of the lateral segment modules or a component in between on a surface, which is orientable transverse to the respective main extension axis.

3. The cabin arrangement according to claim 1, wherein the first vehicle attendant seat is laterally movable and arrestable in at least two laterally distanced positions.

4. The cabin arrangement according to claim 1, wherein the first vehicle attendant seat and the second vehicle attendant seat create a tandem arrangement.

5. The cabin arrangement according to claim 1, wherein the first back wall spans up a plane, which extends perpendicular to the first main extension axis or the second main extension axis.

6. The cabin arrangement according to claim 1, wherein at least one of the first lateral segment module and the second lateral segment module comprises a lavatory, which is accessible through a lavatory opening facing into the aisle.

7. The cabin arrangement according to claim 1, wherein at least one of the lateral segment modules comprises at least one first compartment having an access opening extending perpendicular to the main extension axes.

8. The cabin arrangement according to claim 1, further comprising a closable passage opening at an end of the aisle.

9. The cabin arrangement according to claim 1, wherein each of the lateral segment modules comprise a front directly connected to a door region of the vehicle.

10. The cabin arrangement according to claim 1, wherein at least one lateral segment module comprises a holding device positioned exterior to the receiving space for temporary holding a serving trolley.

11. The cabin arrangement according to claim 1, wherein the receiving space is defined between the first vehicle attendant seat and the second vehicle attendant seat.

12. The cabin arrangement according to claim 1, wherein the second vehicle attendant seat is positioned to fold down into the receiving space.

13. The cabin arrangement according to claim 12, wherein the first vehicle attendant seat and second vehicle attendant seat face in the same facing direction, and are aligned on a seating axis parallel to the facing direction.

14. A passenger cabin comprising:
   a plurality of seats; and
   at least one cabin arrangement, wherein each of the at least one cabin arrangement comprises:
   a first lateral segment module having a first main extension axis;
   a second lateral segment module having a second main extension axis;
   an aisle;
   a first vehicle attendant seat arranged between the main extension axes of the lateral segment modules and at a distance to the lateral segment modules along the main extension axes; and
   a second vehicle attendant seat arranged at a first back wall positioned at an end of one of the first lateral segment module and the second lateral segment module facing away from the first vehicle attendant seat;
   wherein the first main extension axis and the second main extension axis run parallel to each other;
   wherein the first lateral segment module and the second lateral segment module are distanced from each other in a direction perpendicular to the main extension axes and enclose the aisle between each other, wherein the aisle runs parallel to the main extension axes;
   wherein the first lateral segment module comprises at least one receiving space to receive serving trolleys, wherein the at least one receiving space comprises a receiving opening, which faces into the aisle; and
   wherein the at least one receiving space is configured to receive serving trolleys, which are arranged transverse to the first main extension axis and staggered parallel to the first main extension axis.

15. A vehicle comprising:
   a passenger cabin comprising a plurality of seats and a cabin arrangement, the cabin arrangement comprising:
   a first lateral segment module having a first main extension axis;
   a second lateral segment module having a second main extension axis;
   an aisle;
   a first vehicle attendant seat arranged between the main extension axes of the lateral segment modules and at a distance to the lateral segment modules along the main extension axes; and
   a second vehicle attendant seat arranged at a first back wall positioned at an end of one of the first lateral segment module and the second lateral segment module facing away from the first vehicle attendant seat;
   wherein the first main extension axis and the second main extension axis run parallel to each other;
   wherein the first lateral segment module and the second lateral segment module are distanced from each other in a direction perpendicular to the main extension axes and enclose the aisle between each other, wherein the runs parallel to the main extension axes;
   wherein the first lateral segment module comprises at least one receiving space to receive serving trolleys, wherein the at least one receiving space comprises a receiving opening, which faces into the aisle; and
   wherein the at least one receiving space is configured to receive serving trolleys, which are arranged transverse to the first main extension axis and staggered parallel to the first main extension axis.

16. A vehicle according to claim 15, wherein the vehicle is an aircraft and the cabin arrangement is arranged at a front end of the passenger cabin and wherein the aisle connects to a cockpit access.

* * * * *